United States Patent [19]

Melliar-Smith et al.

[11] Patent Number: 5,216,675
[45] Date of Patent: Jun. 1, 1993

[54] RELIABLE BROADCAST PROTOCOL

[75] Inventors: Peter M. Melliar-Smith; Louise E. Moser, both of Santa Barbara, Calif.

[73] Assignee: The United States of America as represented by the Secretary of the Air Force, Washington, D.C.

[21] Appl. No.: 527,610

[22] Filed: May 23, 1990

[51] Int. Cl.⁵ .......................... H04L 1/16; H04H 1/00
[52] U.S. Cl. ...................................................... 371/32
[58] Field of Search .................................... 371/32, 33

[56] References Cited

U.S. PATENT DOCUMENTS

| | | | |
|---|---|---|---|
| 3,824,547 | 7/1974 | Green et al. | 340/146.1 BA |
| 3,876,979 | 4/1975 | Winn et al. | 340/146.1 BA |
| 4,725,834 | 2/1988 | Chang et al. | 340/825.5 |
| 4,745,593 | 5/1988 | Stewart | 370/15 |
| 4,807,224 | 2/1989 | Naron et al. | 370/94 |

OTHER PUBLICATIONS

Melliar-Smith, P. M. et al, "Fault-Tolerant Distributed Systems Based on Broadcast Communication", presented at the 9th Inter. Conference on Distributed Computing Systems, sponsored by IEEE Computer Society, Jun. 5-9, 1989, pp. 129-134.

*Primary Examiner*—Stephen M. Baker
*Attorney, Agent, or Firm*—William G. Auton; Donald J. Singer

[57] ABSTRACT

A broadcast protocol system which uses a plurality of distributed computers which are electrically connected by a broadcast medium. Each message is broadcast to all computers with a header in which there is a message identifier containing the identity of the broadcasting processor and a message sequence number. A retransmission number is also included in the identifier to distinguish retransmissions. Each processor maintains an acknowledgement list of message identifiers with positive and negative acknowledgements.

8 Claims, 4 Drawing Sheets

RELIABLE BROADCAST PROTOCOL

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to distributed computer systems, and more specifically the invention pertains to a broadcast protocol system that reduces the number of messages required for effective communication between remotely located computers in a distributed computer system.

A protocol system may be defined as a set of rules governing the format and timing of message exchanges to control data movements and correct errors. It is important to ensure that the protocol is valid, makes sense, works, and is adhered to by all users of the network in question. Many distributed computer systems use a communication mechanism that is physically a broadcast medium, such as the Ethernet or a packet radio system. Other common communication media, such as the token ring, could function as broadcast media, even though they are not normally so used. The advantage of a broadcast communication medium is that it makes it physically possible to distribute a message simultaneously to several destinations.

There are important activities in a distributed computer system that involve many processors simultaneously and that would benefit from broadcast communication. Among these are scheduling and load balancing, synchronization, access to distributed information, update and commit for distributed databases, and transaction logging.

Existing communication protocols do not allow distributed computer systems to make use of this broadcast capability, but rather require all messages to be point-to-point, from a single source to a single destination. If the nature of the application is such that broadcast communication is appropriate, existing systems must send many individual messages and receive corresponding individual acknowledgements. In a network of N nodes, this results in a total of 2N messages, when perhaps a single broadcast message might have sufficed. The high cost of broadcast communication is not only wasteful of the communication resource, but it also limits the size of the distributed system by saturating the communication system and discourages the use of truly distributed algorithms because of their unnecessarily high communication cost.

Reliable transmission of a message requires the ability to retransmit the message because of damage or loss in transit. Within the ISO protocol hierarchy, the primary responsibility for ensuring this reliable transmission across the broadcast communication medium lies with the link-level communication protocol. This protocol is directed towards that level of the hierarchy. Consequently, the protocol provides only services appropriate to the link level, in contrast to other atomic broadcast protocols that ignore the hierarchy and are designed to be entirely self contained. For example, our protocol can determine whether a node has acknowledged receiving a message, but has no responsibility for network membership or network reconfiguration following a failure. Some of what we describe below may also be relevant to other levels in the protocol hierarchy, particularly the transport level that ensures reliable transmission between hosts.

Most existing link level protocols use positive acknowledgements, in which the recipient of a message explicitly transmits an acknowledgement of its receipt, either as a separate message or as part of another message. The sender of the original message uses a timeout to trigger retransmission if no acknowledgement is received from the recipient. In a broadcast context, such protocols require individual acknowledgments from each recipient, even if it is possible (which it usually is not) to take advantage of the broadcast medium to disseminate the initial message to all recipients. Thus, broadcasting with positive acknowledgements could reduce the number of messages from 2N to N+1, which is still far from taking full advantage of the broadcast medium.

The task of providing a new broadcast protocol system which uses a broadcast medium with a reduced number of messages is alleviated, to some extent, by the systems disclosed in the following U.S. Patents, the disclosures of which are incorporated herein by reference:

U.S. Pat. No. 3,824,547 issued to Green et al;
U.S. Pat. No. 3,876,979 issued to Winn et al;
U.S. Pat. No. 4,725,834 issued to Chang et al;
U.S. Pat. No. 4,745,593 issued to Stewart; and
U.S. Pat. No. 4,807,224 issued to Naron et al.

Chang et al describe a reliable broadcast protocol for a token passing bus network. In the patented system if some receiver in the broadcast group does not receive the broadcast message it can request a retransmission. The primary or token cite receiver, not the source station, retransmits the broadcast message to assure a reliable broadcast system.

Green et al are concerned with a bidirectional data communication system in which positive and negative acquisition signals are utilized to inform a transmitting station as to any errors in the reception of a message. An arrangement for testing a package switching network is set forth in the Stewart patent.

In the system of the Winn et al patent an error in transmission results in the sending of a retransmission request. All messages subsequent to the last sequence number correctly received before the error was detected are retransmitted. Naron et al distribute data to an unlimited number of remote receiver installations.

In addition to the system described above, the most detailed existing description of reliable broadcast protocol is that by Chang and Maxemchuk in their article "Reliable broadcast protocols," ACM Transactions on Computer Systems 2, 3 (August, 1984), 251-273. Their protocol requires that all messages pass through an intermediary node, called the token site. A node wishing to broadcast a message must communicate it to the token site, using a positive-acknowledgement protocol. Using a negative acknowledgement protocol, the token site then broadcasts the message to all recipients; any missing messages are detected by gaps in the sequence. The use of a single common intermediary makes the negative-acknowledgement technique more effective. A complex token passing protocol is used to detect failures at the token site, to select a new token site, and to retransmit messages affected by the failure. Although two messages and one acknowledgement are required for every message broadcast in the absence of errors, the token passing protocol can, in fact, add significantly to the number of messages if transmission errors are frequent.

In view of the foregoing discussion, it is apparent that their remains a need to provide a broadcast protocol system that reduces the number of messages between remotely located computers. The present invention is intended to satisfy that need.

SUMMARY OF THE PREFERRED INVENTION

The present invention includes a broadcast protocol for the link-level of a distributed computer system. Each message is broadcast with a header in which there is a message identifier and a message sequence number and each node maintains a list of positive and negative acknowledgement message identifiers. When a node receives a message not previously received in an uncorrupted state, it adds the identifier as an acknowledgment to its list. If a node receives a negative acknowledgement for one of its messages, or has received no positive acknowledgement within some time interval, it retransmits the messages. The retransmission must be identical to the prior transmission, and thus must carry with it all of the acknowledgements, positive or negative, carried by the prior transmission of that message.

As described above, it is an object of the present invention to provide a reliable link-level or transport-level protocol. Messages should be capable of being broadcast simultaneously to many destinations, without the need for explicit acknowledgement by every recipient. The originator of the message should be assured that all working destinations have received the message, or that one or more destinations did not receive the message and that it should therefore be retransmitted. It should also be possible to confirm that certain specified destinations were working and did receive the message.

The protocol does not require that messages from one source will be delivered in the order in which they were originated by that source. There is no requirement that messages from different sources be received in any particular order.

Reliable communication that depends on backward error recovery and retransmission necessarily incurs a delay before the originator of a message can be certain that all the intended recipients of the message have indeed received it. In a positive-acknowledgement system, that delay is represented by the time until the last acknowledgment is received. In a negative acknowledgement system, the situation is more complicated. Some kinds of messages are such that it is the time to the first response that is important (e.g., "Give me the value of X"). For other types of messages (e.g., "Update the current value of X"), the delay may be the time until the originator can be certain that every working node has received the message. This time is much less certain in a negative-acknowledgement system, but may be an important performance parameter in some contexts.

Generally, the load imposed in the absence of errors is more important than the additional load induced when errors occur, since they are not very frequent. Similarly, the delay until confirmation of delivery is usually more important for delivery to a working node. Deduction that a node has failed may be based in part on information provided by this level of the hierarchy to the effect that no response has been obtained from the node; the decision, however, lies above the link level.

The protocol must operate reliably in a network subject to a variety of faults. Among these, in particular, are: transmission faults, reception faults, network-partitioning faults, and node faults.

Transmission faults are faults in which the transmitted message is either not received by any destination or is received in a garbled condition by all destinations. We assume that transmission faults are relatively infrequent.

Reception faults are faults in which one or more destinations do not receive the message or receive it garbled, while other destinations receive it correctly. Again we assume that reception faults are relatively infrequent, say, substantially fewer than one error per N messages in an N node system.

Network partitioning faults are faults in which the network is divided by the fault into two or more subnets, with communication remaining possible within each subnet but not among subnets.

Node fail-stop faults are faults in which a node ceases operation. We assume that a failed node rejoining the network is aware that is has failed, since transitional acknowledgement rules must be applied.

We assume that a node can apply adequate checks to a message it has received to ensure that it has been received uncorrupted. We exclude faults involving babbling nodes and faults resulting in the total inability of all nodes to use the communication medium, since there is no way of ensuring recovery from such faults with a single communication medium. Malicious nodes are excluded. We also exclude faults that result in one or more pairs of nodes being systematically unable to communicate, even though there are other nodes with which both members of a pair can communicate. Such faults could result from misadjusted transmitters and receivers that are marginally operative and thus able to communicate with some, but not all, other nodes. We exclude this type of fault because it does not lie within the scope of a link-level protocol; we do not wish to complicate the protocol with a forwarding requirement that is properly the responsibility of the network level.

Distributed systems present challenging problems of maintaining consistency of distributed data in the presence of faults. These problems are currently solved by agreement protocols that require many messages to be exchanged between processors with adverse effects on system performance. A novel approach to the design of fault-tolerant distributed systems avoids this message exchange, resulting in systems that are substantially more efficient. The approach is based on broadcast communication over a local area network, such as the Ethernet, and on two novel protocols, the Trans protocol which provides efficient reliable broadcast communication, and the Total protocol which, with high probability, promptly places a total order on messages and achieves distributed agreement even in the presence of a fault. Reliable distributed operations, such as locking, update, and commitment, require only a single broadcast message rather than the several tens of messages required by current algorithms.

The object described above together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a broadcast protocol system for use with remotely located computers in a distributed computer system.

As mentioned above, the present invention is for use with distributed computers which use a broadcast system as a communications link. A broadcast communications medium allows one to distribute a message simultaneously to several destinations. Examples of suitable broadcast and multicast systems include: the Ethernet system, packet radio systems, and the token ring system. In order to ensure that such systems are understood, the reader's attention is now directed towards FIGS. 1 and 2, which respectively depicts the multicast data distribution system of the above-cited Naron et al reference, and an illustration of a broadcast local area network system.

An important feature enabling the present invention to provide swift data delivery is the utilization of either a broadcast, or a "multicast" data delivery approach. For the purposes of this application, the term "multicast" is defined as the sending of information from one-source-to-many, but not necessarily all, receiver devices connected to a communications network. One inherent requirement in utilizing a "multicast" data delivery approach is that data must be able to be collected at a single or small number of data sources from which all data is to be transmitted.

The delivery of data from a single source is preferred and advantageous in that a single data source means 100 is able to maintain control (i.e., does not have to share the transmission time or bandwidth) of the data communication network. In other systems which transmit data from a plurality of data sources, unnecessary data delay is introduced as the respective sources fight for control of the communication network (via handshaking, etc.) before transmitting their data onto the communications network. In the system illustrated in FIG. 1, there are shown data collection means 98 and 99 which collect relevant data, and supply the data to the single data source means 100. It should be understood that the data collection means 98 and 99 could each represent any well known data collection devices, for example, IBM PCs with appropriate communication facilities.

Figure 1:
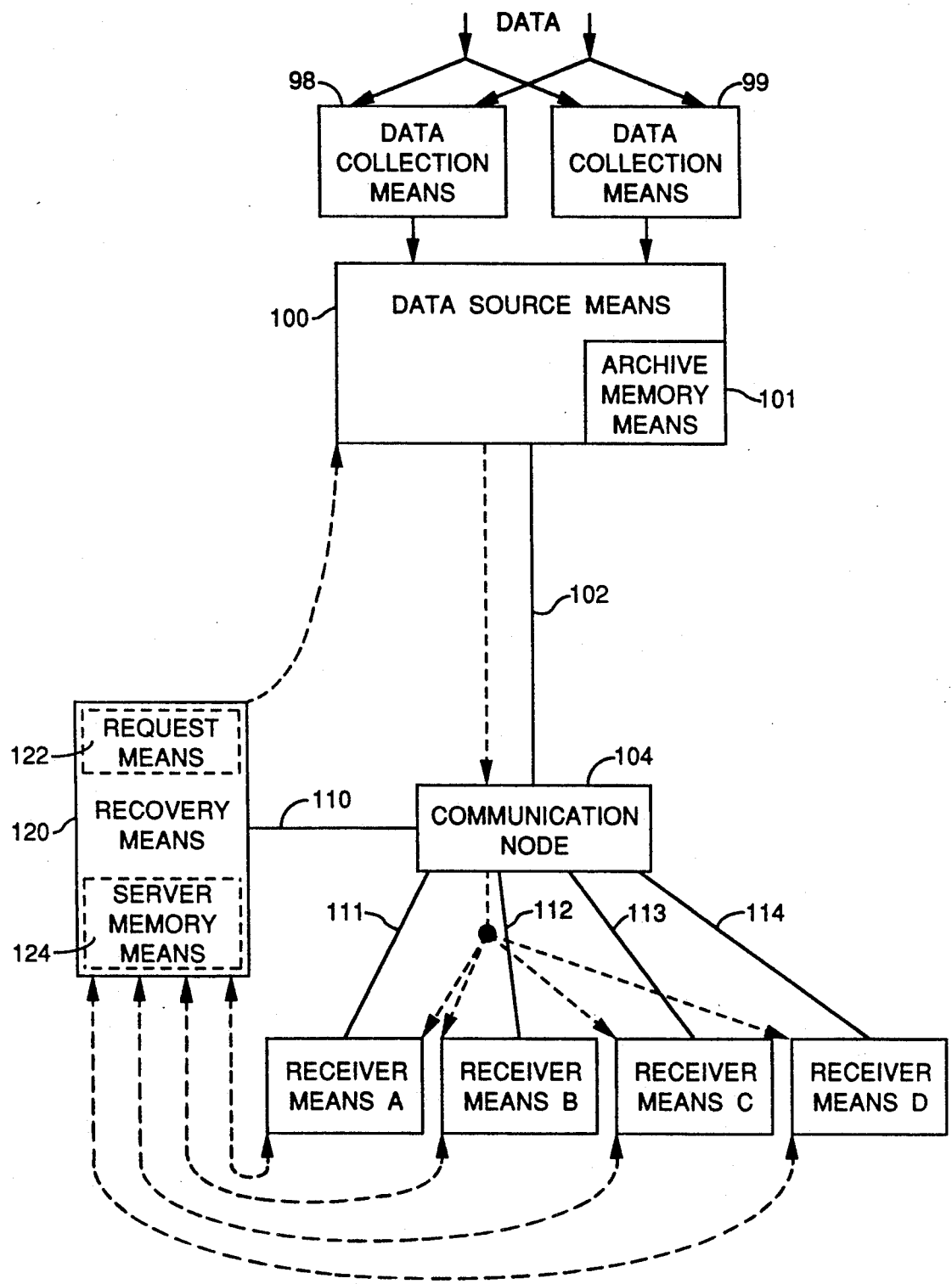
FIG. 1 is an illustration of a prior art broadcast system which may be used in the present invention.
Figure 2:
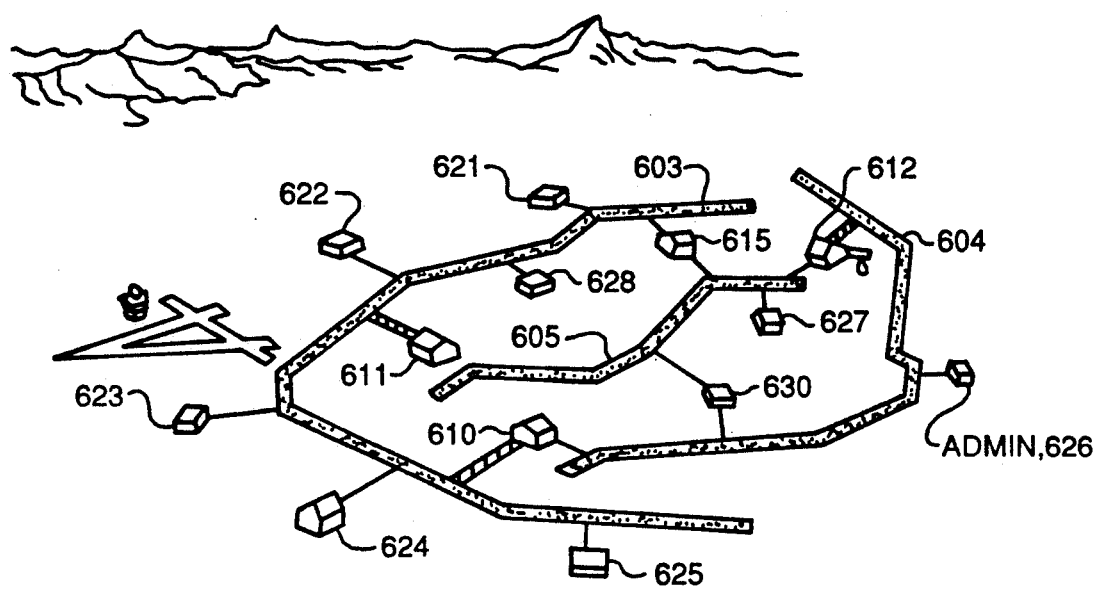
FIG. 2 is an illustration of remote facilities interconnected by the broadcast protocol system of the present invention.

In FIG. 1 the data processors of means A, B, C and D are all electrically interconnected, and each capable of simultaneously communicating with all of the others. Similarly, the remotely located data processor facilities 621-628 of FIG. 2 are all connected by a broadcast network and are capable of simultaneously communicating with each other. The issue which arises with the systems of FIGS. 1 and 2 is "what is the most efficient protocol for message formatting and exchange between the remote facilities?" An answer to this issue is discussed below.

Expressed in informal terms, the broadcast link-level protocol of the present invention requires that each message be broadcast with a header in which there is a message identifier containing the source of the message and a message sequence number. A version number is also included in the identifier to distinguish retransmissions. Sequence numbers can be repeated over some suitably long interval. The message also carries an error-detecting code. Other fields of the header, such as a message destination list, may be present but do not play any part in this protocol.

Additionally, it is required that each computer maintains a list of positive-and negative-acknowledgement message identifiers. Whenever it broadcasts a message, an acknowledgement of the latest message is sent.

When a computer receives a message not previously received in an uncorrupted state, it adds the identifier as an acknowledgement to its list. If the message is uncorrupted, the identifier is added as a positive acknowledgement; if the message is corrupted but with an uncorrupted header, the identifier is added as a negative acknowledgement.

When a computer sees a positive acknowledgement appended to a message that it receives, it deletes from its own list any positive acknowledgement for that message. When it sees a negative acknowledgement for a message, it deletes from its list any acknowledgement for that message, whether positive or negative.

When a computer sees a positive acknowledgement for a message that it has not received, it adds a negative acknowledgement to its list.

If a computer has no messages pending, it may be necessary to construct a null message to carry acknowledgement messages. The acceptable delay before transmitting a null message may differ for positive and negative acknowledgements.

In the broadcast protocol system each of the distributed computers make a comparison to the sequence number of messages identified in the positive acknowledgement messages with sequence numbers of actually received messages on the list it maintains. Each of the distributed computers will broadcast a negative acknowledgement message whenever this comparison indicates that the computer has missed a message.

When a computer receives a negative acknowledgement for one of its messages, or has received no positive acknowledgement within some time interval, it retransmits the message. The retransmission is identical to the prior transmission, and is modified from the prior transmission in that it must carry with it all of the acknowledgements, positive or negative, carried by the prior transmission of that message.

As an example, consider the following message sequence, in which uppercase letters represent messages (we do not bother to denote the source of the message directly), lowercase letters represent acknowledgements, and overhead bars denote negative acknowledgements.

A  Ba  Cb  D$\overline{c}$  Cbd  Ec

Here the negative acknowledgement of C that accompanies message D triggers a retransmission. Note that the computer broadcasting message E also acknowledges message C; in doing so, it implicitly acknowledges messages B and D and through B message A as well. This implicit acknowledgement is the basis of the reliability property described below.

The effect of missing several messages can be considered in this example.

A  Ba  Cb  Dc̄  Cbd  Ec̄b  Bae  Fb

Here the node broadcasting message D received message C garbled and saw nothing of message B. When C is retransmitted with a positive acknowledgment for B, that node becomes aware that it missed B and transmits a negative acknowledgement. Thus a short sequence of missing messages can be recovered; however, it would be unwise to depend on this technique for recovery from a lengthy node failure.

Depending on the format of messages and the form of error-detecting codes used, it may not be possible to determine with confidence the identifier of a message that is received corrupted. If so, computers or nodes that receive such corrupted messages cannot enqueue a negative acknowledgement for fear that the identifier might be incorrect, but instead must simply ignore the corrupted message. If some other node has received the message uncorrupted and broadcasts an acknowledgement, then one or more of the nodes that received the message corrupted will generate the negative acknowledgement, based on the positive acknowledgement for a message that they have not yet seen. If no node receives the message uncorrupted, no positive acknowledgment will be generated and the originating node will retransmit the message after the timeout. Because of the nature of the acknowledgement protocol, the timeout need not be long and thus the effect on performance should be negligible.

It is permissible but not essential for a computer or a node to broadcast a positive acknowledgement for a message that it had already received uncorrupted. Nodes should not broadcast negative acknowledgements for such messages, as this can cause additional, unnecessary retransmissions, possibly never terminating if errors are sufficiently frequent.

Ideally, retransmission should be identical to each previous transmission of the same message, but this does not always happen. To help facilitate this, a node that receives a message carrying a negative acknowledgement of one of its own messages must not append the positive acknowledgement of that message to the retransmission; the positive acknowledgement must wait in the queue for some subsequent message. Permitting further acknowledgements to be added to a message on retransmission would preclude a node that has already received the message from ignoring the retransmission, and would thus risk incurring the non terminating sequence of retransmissions.

When a computer joins or rejoins an already operating network, the first few positive acknowledgements that it receives will be for messages that were broadcast prior to its entry into the network and that it therefore has not received. If the node broadcasts negative acknowledgments for those messages, forcing their retransmission, it will receive with those messages the positive acknowledgements to even earlier messages. This results in replaying the entire message history of the network in reverse order! To avoid this, we require that a processor joining or rejoining the network should broadcast negative acknowledgements only for messages with sequence numbers greater than the sequence number of a message that it has received correctly.

The description of the protocol given above is a rather operational description that requires immediate performance of the operations, without regard to other node performance constraints or the need to make continuous use of the broadcast medium. Clearly, the performance of the protocol is improved if each node can respond very rapidly to each message it receives. Ideally, on seeing an acknowledgement appended to a message, the node should be able to ensure that it will not also transmit the same acknowledgement, even if it is next in line to transmit the same acknowledgement, even if it is next in line to transmit a message that has already been prepared with that same acknowledgement attached. Similarly, on receiving a message, a node might be able to include the acknowledgement with its next message, even if the latter must be transmitted immediately.

In practice, however, it takes time to check the cyclic redundancy check code, manipulate acknowledgement queues, and construct message packets, while efficient use of the communication medium requires that the next message be transmitted with as little delay as possible. The idealized expectation that reception of a message can be reflected in the acknowledgements that accompany the next message is unrealistic. Nevertheless, delays in broadcasting acknowledgements and extra acknowledgements, either positive or negative, have no logical effect on the protocol and only a very small effect on performance. Thus it is of little significance if processing constraints do not permit immediate acknowledgement or immediate removal of acknowledgements form pending messages, so that some acknowledgements are delayed a few messages while others are broadcast twice. The formal temporal logic specifications impose temporal constrains on acknowledgement that do not imply the unrealistic requirements inherent in the behavioral description.

Provided that the proportion of messages received corrupted is much less than 1/N for an N node network and that there are no pairs of nodes that are systematically unable to communicate, the protocol appears quite robust. We can define for it a strong reliability property.

When a node acknowledges a message, if there are no unacknowledged messages prior to that message and if no prior message has an outstanding negative acknowledgement, then the node must have received correctly every message prior to the message it acknowledged. In order to compare the broadcast protocol with existing link-level protocols, a simple queuing theory analysis has been done. To ensure a fair comparison, we require for the reliable broadcast protocol that every node broadcast a message, possibly null, within a prescribed time interval to ensure that the originators of broadcast messages can be certain that every recipient has the message. We shall compare the time to obtain such positive acknowledgement with the corresponding time for other protocols. This positive acknowledgement comparison imposes a heavy burden on the negative acknowledgement broadcast protocol, but by almost any other measure the broadcast protocol is so much better that there is little point in even making a comparison.

Consider first a simple point-to-point positive-acknowledgement system.

Let the
    Number of nodes in the network be n
    Time to transmit a message be s
    Ratio of the time to transmit a
        message to the time to transmit
        an acknowledgement be p
    Proportion of messages awaiting
        broadcast be r
    Rate of demand for message
        transmission be v.

Then the load on the broadcast medium is:

$$\lambda = sv(1-r+nr)(1+p),$$

and the time to broadcast a message and receive the corresponding acknowledgements is:

$$\frac{s(1+p)(1-r+nr)}{1-\lambda}$$

This may be rather optimistic, since it assumes random initiation of broadcasts and thus understates the amount of contention that arises between message broadcasts and attempts to acknowledge prior broadcasts. Careful implementation of such a protocol may succeed in reducing such contention. To some extent, it also disregards the effects of disparities in the lengths of messages and acknowledgements.

Turning to the reliable broadcast protocol, we must define the time period for which a node must wait before sending a null message to indicate that it is still present in the network and has received prior broadcasts. We also denote by q the probability that a node will not have transmitted a regular message with d and thus will require a null message.

Then, the load on the broadcast medium is $$\lambda = sv(1-r)(1+p) + svr(1+npq)$$

where $$q = \exp\left(-\frac{v}{n} \quad \frac{s\lambda}{1-\lambda} + d,\right.$$

while the delay incurred before it is certain that the broadcast message has been received by all destinations is $$\frac{s(1-r)(1+p) + rs(1+npq)}{1-\lambda}.$$

These equations were solved numerically by using a simple Pascal program to obtain the results shown in the following figures.

Figure 3:
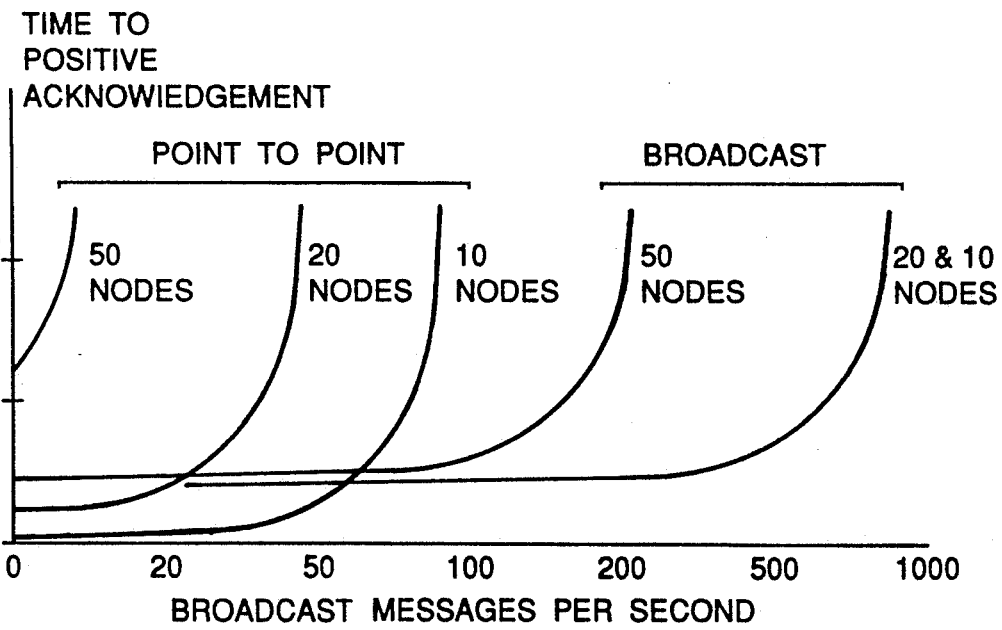
FIG. 3 is a chart of the comparison of times of positive acknowledgement for point-to-point and broadcast protocols.

FIG. 3 compares the time to receipt of a positive acknowledgement in systems of three sizes-10, 20 and 50 nodes. We assume that transmission of a typical message requires use of the broadcast medium for 1 ms, while an acknowledgement alone requires only 0.1 ms. In this figure, we assume that a node will transmit an acknowledgement within 100 ms if it has not sent any other message within that time. As expected, the results of the analysis show that a 10-node point-to-point protocol becomes saturated at about 90 messages per second, a 20-node system at about 45 messages per second, and a 50-node system at about 18 messages per second. In contrast, the 10- and 20-node broadcast protocol results are almost identical, becoming saturated at about 1000 messages per second; at that load all acknowledgements can be piggybacked onto other messages. In the 50-node system, the broadcast protocol becomes satured at about 250 messages per second. At all sizes, the broadcast protocol provides an order-of-magnitude increase in potential traffic load.

Figure 4:
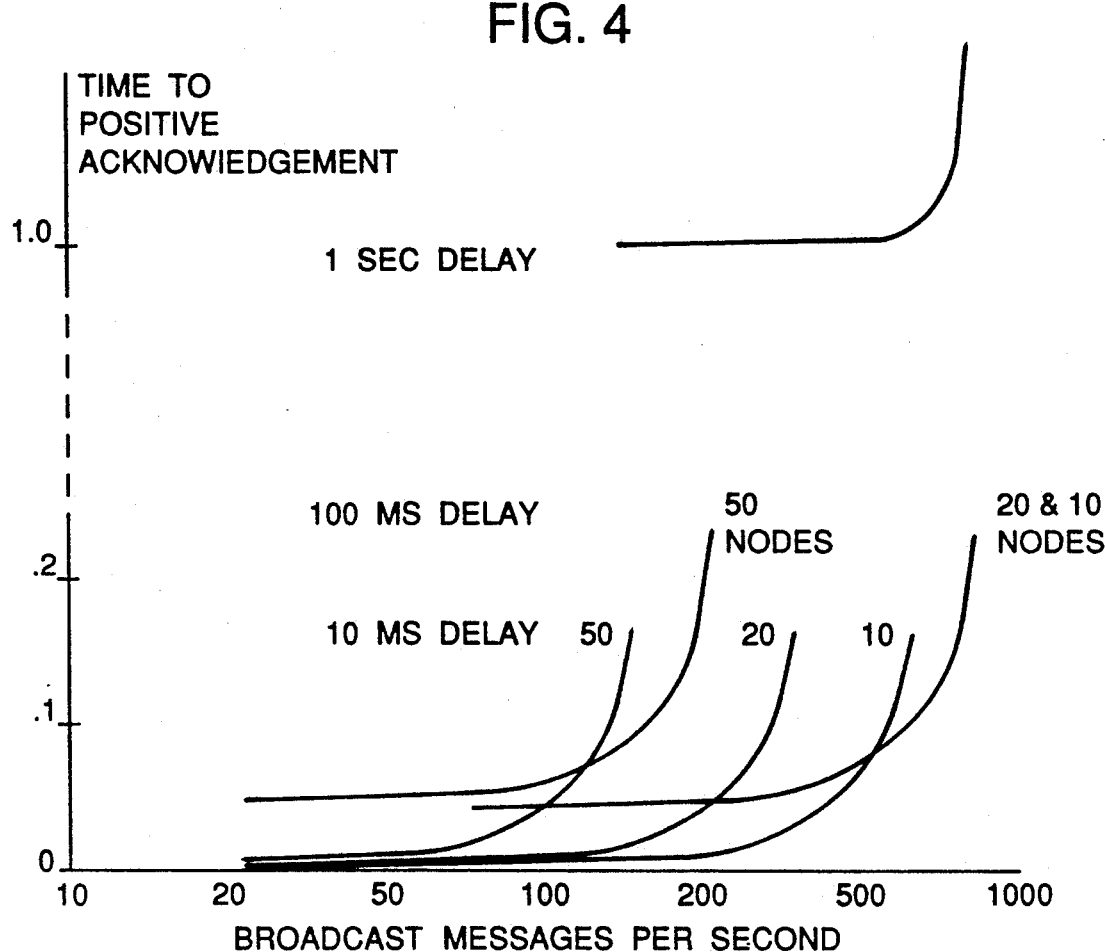
FIG. 4 is a chart of the effect of delay time on protocol performance.

It is also appropriate to investigate the effect of a node's waiting time before broadcasting an acknowledgement when it has no other message to transmit. When the delay is as long as one second, FIG. 4 shows that the results of systems containing 10, 20 and 50 nodes are almost identical and that all become saturated at about 1000 messages per second. But, of course, the time to positive acknowledgement, but now causes all sizes to become saturated below 1000 messages per second. In each case, however, the broadcast protocol is able to support much more traffic than a point-to-point protocol, with comparable times to positive acknowledgement.

Figure 5:
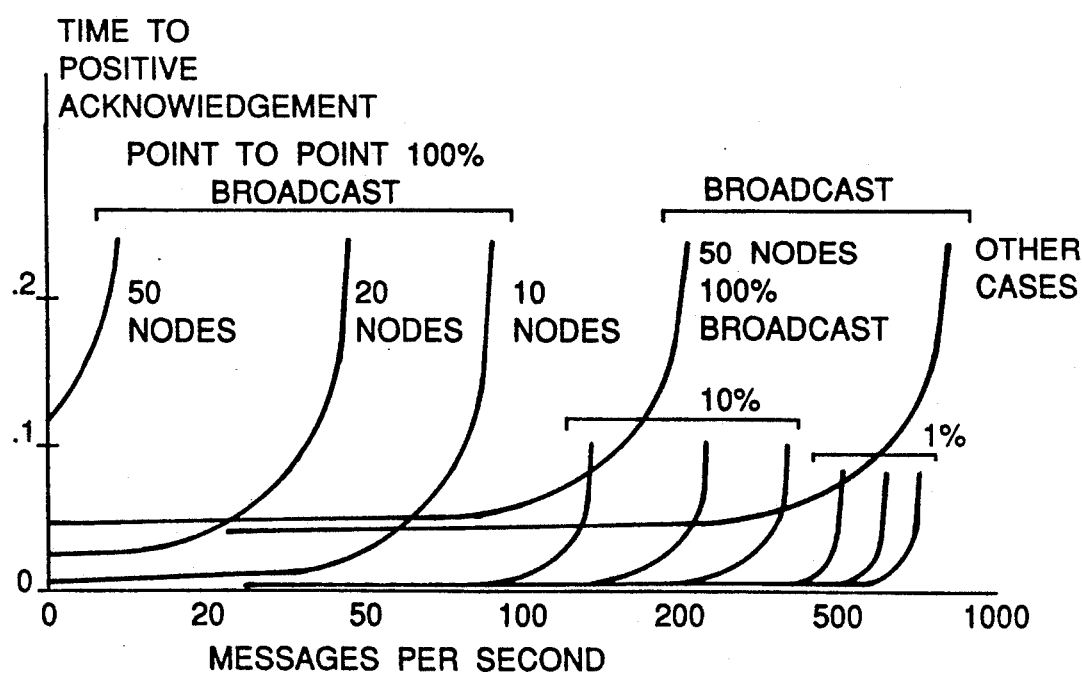
FIG. 5 is a chart of the effect of the proportion of messages broadcast on the protocol performance.

Finally, we consider the possibility that not all of the messages require broadcasting to all other nodes; some messages are intended or only a single destination. FIG. 5 shows results for 100%, 10%, and 1% of all messages requiring broadcast. The point-to-point protocol shows substantially better performance as the proportion of broadcast messages diminishes. The broadcast protocol results are identical except for the 50 node, 100% broadcast case. Clearly, the advantage of the broadcast protocol lessens commensurately as the proportion of broadcast messages is reduced.

Figure 6:
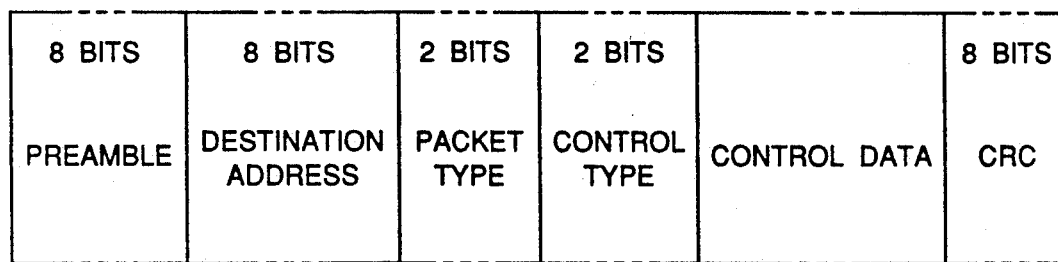
FIG. 6 is an illustration of a prior art message format.

FIG. 6 is an illustration of a prior art message format used in the above-cited Chang et al reference. The contents of the actual message are in the "control data" portion of the message, and may occupy as many bits as necessary. The message always includes a preamble and a destination address, as explained in the reference.

Figure 7:
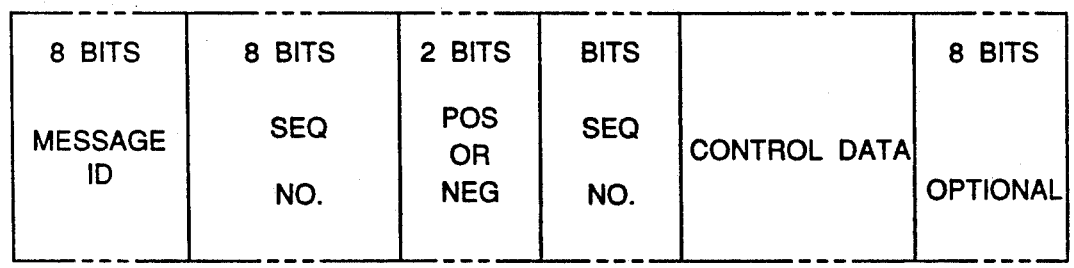
FIG. 7 is an illustration of a format of a message using the present invention.

FIG. 7 is an illustration of an example of a message that might be used with the present invention. As described above, the message begins with a message header which includes a message identifier and a sequence number. In FIG. 7, the identifier can include an ID number of the originating computer that generated the message. The sequence number is a numerical designation of the message with respect to all messages previously sent, and is incremented by one with each new message.

As described above, all computers in the system maintain a list which contains the sequence numbers of all messages they receive. Each computer sends a positive or negative acknowledgement of the latest message they have received as part of the next message that they broadcast. If a computer receives a negative acknowledgement it rebroadcasts the message corresponding with the sequence number of the negative acknowledgement. The "POS OR NEG" portion of the message is a two bit signal which indicates if the type of acknowledgement is positive (01) or negative (00). The sequence number following "POS OR NEG" is the sequence number of the message being acknowledged.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A broadcast protocol system for controlling digital signals between remote facilities, said broadcast protocol system comprising:

a broadcast communications medium that allows data processors to send messages to each other; and a plurality of distributed computers which are electrically connected to each other by said broadcast medium so that each message generated by one of said distributed computers is broadcast to all of the other distributed computers with a message header containing a message identifier and a message sequence number, each of said distributed computers maintaining a list of all messages received, and broadcasting a positive acknowledgement message in response to each unacknowledged message received, each of said distributed computers broadcasting a negative acknowledgement message responsive to receiving a positive acknowledgement message which identifies a message not on its list, and the distributed computer that orginates the message rebroadcasting said message responsive to receiving a negative acknowledgement message.

2. A broadcast protocol system, as defined in claim 1 wherein each one of said distributed computers include said positive acknowledgement message as part of a next message that it is to originate.

3. A broadcast protocol system, as defined in claim 1, wherein each of said plurality of distributed computers will rebroadcast a message identified in a negative acknowledgement.

4. A broadcast protocol system, as defined in claim 2, wherein each of said plurality of distributed computes will rebroadcast a message identified in a negative acknowledgement.

5. A broadcast protocol system, as defined in claim 1, wherein each of said distributed computers makes a comparison to the sequence number of messages identified in the positive acknowledgement messages with sequence numbers of actually received messages on the list it maintains, and wherein each of said distributed computers will broadcast a negative acknowledgement message whenever this comparison indicates that the computer has missed a message.

6. A broadcast protocol system, as defined in claim 2, wherein each of said distributed computers makes a comparison to the sequence number of messages identified in the positive acknowledgement message with sequence numbers of actually received messages on the list it maintains, and wherein each of said distributed computers will broadcast a negative acknowledgement message whenever this comparison indicates that the computer has missed a message.

7. A broadcast protocol system, as defined in claim 3, wherein each of said distributed computers makes a comparison to the sequence number of messages identified in the positive acknowledgement messages with sequence numbers of actually received messages on the list it maintains, and wherein each of said distributed computers will broadcast a negative acknowledgement message whenever this comparison indicates that the computer has missed a message.

8. A broadcast protocol system, as define din claim 4, wherein each of said distributed computers makes a comparison to the sequence number of messages identified in the positive acknowledgement messages with sequence numbers of actually received messages on the list it maintains, and wherein each of said distributed computers will broadcast a negative acknowledgement message whenever this comparison indicates that the computer has missed a message.

* * * * *